（12）United States Patent
Du et al.

(10) Patent No.: US 8,035,650 B2
(45) Date of Patent: Oct. 11, 2011

(54) TILED CACHE FOR MULTIPLE SOFTWARE PROGRAMS

(75) Inventors: Yun Du, San Diego, CA (US); Guofang Jiao, San Diego, CA (US); Chun Yu, San Diego, CA (US); De Dzwo Hsu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 11/493,444

(22) Filed: Jul. 25, 2006

(65) Prior Publication Data

US 2008/0028152 A1 Jan. 31, 2008

(51) Int. Cl.
*G09G 5/36* (2006.01)
*G06F 15/167* (2006.01)
*G06F 13/00* (2006.01)
*G06F 13/28* (2006.01)

(52) U.S. Cl. ......... 345/557; 345/542; 711/119; 711/120
(58) Field of Classification Search .................. 345/557, 345/542; 711/120, 119
See application file for complete search history.

(56) References Cited

U.S. PATENT DOCUMENTS

| | | | | |
|---|---|---|---|---|
| 5,282,274 | A * | 1/1994 | Liu ................................ | 711/206 |
| 6,351,801 | B1 * | 2/2002 | Christie et al. ................ | 712/205 |
| 6,871,264 | B2 * | 3/2005 | Soltis, Jr. ...................... | 711/122 |
| 2003/0225976 | A1 * | 12/2003 | Hokenek et al. .............. | 711/133 |
| 2006/0085588 | A1 * | 4/2006 | Rajwar et al. ................. | 711/100 |
| 2006/0146366 | A1 * | 7/2006 | Jang ............................. | 358/1.15 |

FOREIGN PATENT DOCUMENTS

KR 1020060067964 6/2006

OTHER PUBLICATIONS

Multithreading in .NET Applications, www.developer.com//article.php/2202491, May 2003.*
PCGuide; Comparison of Cache Mapping techniques; http://www.pcguide.com/ref/mbsys/cache/funcComparison-c.html; Apr. 17, 2001.*
Die.net; Cache Line Definition; http://dictionary.die.net/cache%20line; dated Jan. 21, 1997.*
International Search Report—PCT/US07/074266—International Search Authority—European Patent Office—Dec. 11, 2007.
Written Opinion—PCT/US2007/074266, International Search Authority, European Patent Office, Dec. 11, 2007.

* cited by examiner

*Primary Examiner* — Kee M Tung
*Assistant Examiner* — Carlos Perromat
(74) *Attorney, Agent, or Firm* — Alex C. Chen; James R. Gambale, Jr.

(57) ABSTRACT

Caching techniques for storing instructions, constant values, and other types of data for multiple software programs are described. A cache provides storage for multiple programs and is partitioned into multiple tiles. Each tile is assignable to one program. Each program may be assigned any number of tiles based on the program's cache usage, the available tiles, and/or other factors. A cache controller identifies the tiles assigned to the programs and generates cache addresses for accessing the cache. The cache may be partitioned into physical tiles. The cache controller may assign logical tiles to the programs and may map the logical tiles to the physical tiles within the cache. The use of logical and physical tiles may simplify assignment and management of the tiles.

24 Claims, 9 Drawing Sheets

TILED CACHE FOR MULTIPLE SOFTWARE PROGRAMS

BACKGROUND

I. Field

The present disclosure relates generally to electronics, and more specifically to techniques for providing storage for multiple software programs.

II. Background

Many electronics devices are capable of executing multiple software programs in parallel. For example, a graphics processor may execute multiple graphics programs for applications such as video games, graphics, imaging, etc. Each program is a sequence of instructions. A program counter may be maintained for each program and may point to the current instruction to be executed for the program.

The programs being executed may be large and thus stored in a mass storage unit. To improve operating speed, a small portion of each program may be loaded from the mass storage unit onto an instruction cache, which is a fast memory located closer to the processor. The instruction cache may store instructions for all programs being executed. To improve utilization of the instruction cache, the programs may share the same address space within the cache. This would then allow each cache location to store an instruction for any program.

A major issue with storing instructions for multiple programs in one cache is "instruction thrashing" among the programs. Instruction thrashing is a phenomenon in which more than one program contends for the same location of the cache and their instructions continually overwrite one another. Instruction thrashing results in excessive cache misses. A cache miss occurs whenever a desired instruction is not found in the cache. A cache miss causes delays in execution of the instruction since the cache is typically first filled with the instruction, and the instruction is then retrieved and executed. Instruction thrashing may adversely impact performance for all affected programs.

SUMMARY

Techniques for storing instructions, constant values, and other types of data for multiple software programs in a cache are described herein. The techniques avoid trashing among the programs and further allow for efficient sharing of the available cache storage space among the programs.

In an embodiment, an apparatus includes a cache and a cache controller. The cache provides storage for multiple programs and is partitioned into multiple tiles. Each tile is assignable to one program. Each program may be assigned any number of tiles based on the program's cache usage, the available tiles, and/or other factors. The cache controller identifies the tiles assigned to the programs and generates cache addresses for accessing the cache.

In an embodiment, the cache is partitioned into multiple physical tiles. The cache controller assigns logical tiles to the programs and maps the logical tiles to the physical tiles within the cache. The use of logical and physical tiles may simplify assignment of tiles to programs and management of the tiles. The cache controller receives a program counter for a program, derives a logical tile address based on the program counter, generates a physical tile address based on the logical tile address and the mapping of logical tiles to physical tiles, and forms a cache address with the physical tile address. A desired instruction is then retrieved from the cache at the cache address determined by the cache controller.

Various aspects and embodiments of the invention are described in further detail below.

BRIEF DESCRIPTION OF THE DRAWINGS

Aspects and embodiments of the invention will become more apparent from the detailed description set forth below when taken in conjunction with the drawings in which like reference characters identify correspondingly throughout.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The caching techniques described herein may be used for various systems and devices capable of executing multiple software programs in parallel. For example, the techniques may be used for computing devices, communication devices, etc. For clarity, the techniques are specifically described below for a graphics system.

Figure 1:
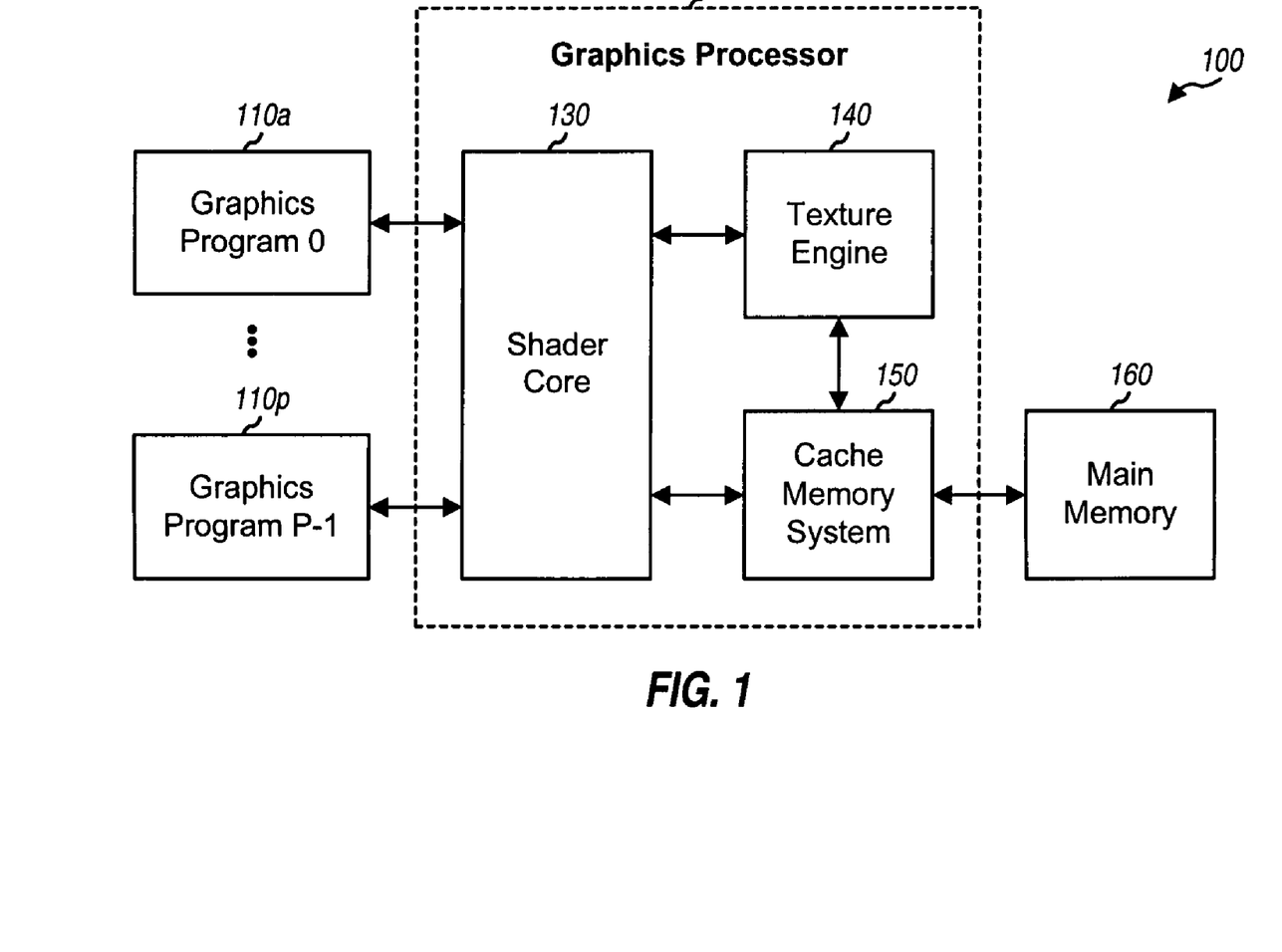
FIG. 1 shows a block diagram of a graphics system.

FIG. 1 shows a block diagram of a graphics system 100, which may be a stand-alone system or part of a larger system such as a computing system, a wireless communication device (e.g., a cellular phone), etc. Graphics system 100 supports P graphics programs/applications 110a through 110p with program IDs of 0 through P−1, respectively, where P may be any integer value. Programs 110a through 110p may execute in parallel and may be for video games, graphics, and/or other applications.

A graphics processor 120 performs processing for programs 110a through 110p. Graphics processor 120 may split the processing of each program into a series of threads, e.g., automatically and transparent to the program. A thread (or thread of execution) indicates a specific task that may be performed with a set of one or more instructions. Threads allow a program to have multiple tasks performed simultaneously by different units and further allow different programs to share resources.

In the embodiment shown in FIG. 1, graphics processor 120 includes a shader core 130, a texture engine 140, and a cache memory system 150. A core generally refers to a processing unit within an integrated circuit. The terms "core", "engine", "machine", "processor" and "processing unit" are often used interchangeably. Shader core 130 may perform graphics operations such as shading, which is a highly complex graphics operation involving lighting, shadowing, etc. Texture engine 140 may perform graphics operations such as texture mapping, which is another complex graphics operation involving modification of the color of pixels with the color of a texture image. Cache memory system 150 may include one or more caches, which are fast memories that can store instructions and/or data for shader core 130 and texture engine 140. Graphics processor 120 may include other processing and control units, engines, and memories. Graphics processor 120 may also implement a software interface such as Open Graphics Library (OpenGL), Direct3D, etc. OpenGL is described in a document entitled "The OpenGL® Graphics System: A Specification," Version 2.0, dated Oct. 22, 2004, which is publicly available.

A main memory 160 is a large, slower memory located further away (e.g., off-chip) from graphics processor 120. Main memory 160 stores instructions and data that may be loaded into the caches within cache memory system 150. Main memory 160 may store all of the programs being executed by graphics processor 120.

Figure 2:
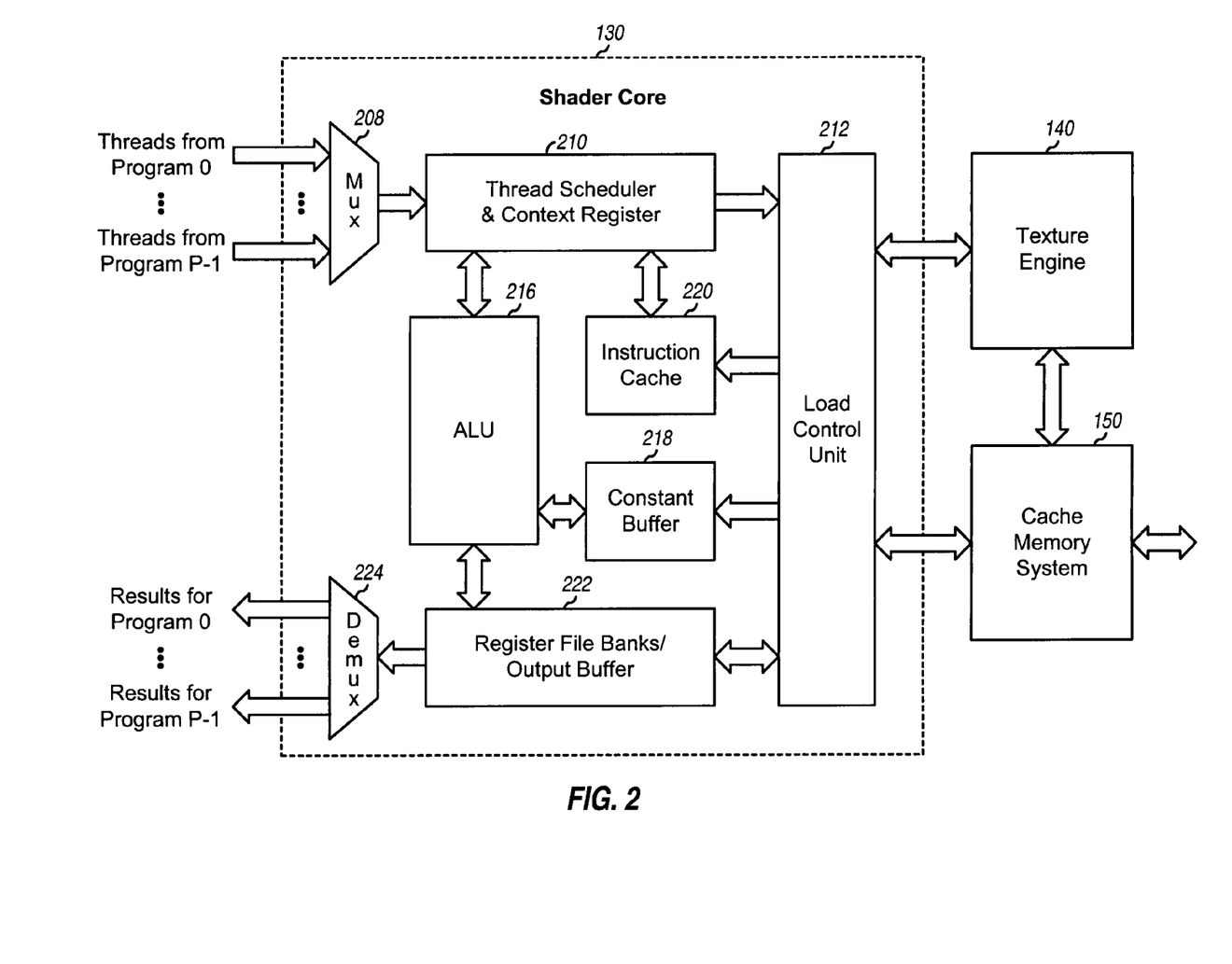
FIG. 2 shows a block diagram of a shader core within the graphics system.

FIG. 2 shows a block diagram of an embodiment of shader core 130 in FIG. 1. Within shader core 130, a multiplexer (Mux) 208 receives threads from programs 110a through 110p and provides these threads to a thread scheduler and context register 210. Thread scheduler 210 performs various functions to schedule and manage execution of threads. Thread scheduler 210 determines whether to accept new threads, creates a register map table for each accepted thread, and allocates resources to the threads. The register map table indicates mapping between logical register address to physical register file address. For each thread, thread scheduler 210 determines whether resources required for that thread are ready, pushes the thread into a sleep queue if any resource (e.g., instruction, register file, or texture read) for the thread is not ready, and moves the thread from the sleep queue to an active queue when all of the resources are ready. Thread scheduler 210 interfaces with a load control unit 212 to synchronize the resources for the threads.

Thread scheduler 210 also manages execution of threads. Thread scheduler 210 fetches the instruction(s) for each thread from an instruction cache 220, decodes each instruction if necessary, and performs flow control for the thread. Thread scheduler 210 selects active threads for execution, checks for read/write port conflict among the selected threads and, if there is no conflict, sends instruction(s) for one thread to an arithmetic logic unit (ALU) 216 and sends instruction(s) for another thread to load control unit 212. Thread scheduler 210 maintains a program counter for each thread and updates this counter as instructions are executed or program flow is altered. Thread scheduler 210 also issues requests to fetch missing instructions and removes threads that are completed.

Instruction cache 220 stores instructions for programs 110a through 110p. These instructions indicate specific operations to be performed for each thread. Each operation may be an arithmetic operation, an elementary function, a memory access operation, etc. Instruction cache 220 may be loaded with instructions from cache memory system 150 and/or main memory 160, as needed, via load control unit 212.

ALU 216 performs arithmetic operations such as addition, subtraction, multiplication, multiply and accumulate, absolute, negation, comparison, saturation, etc. ALU 216 may also perform logical operations such as AND, OR, XOR, etc. ALU 216 may also perform format conversion, e.g., from integers to floating point numbers, and vice versa. A constant buffer 218 stores constant values (e.g., scale factors, filter weights, etc.) used by ALU 216.

Load control unit 212 controls the flow of instructions and data for various units within shader core 130. Load control unit 212 interfaces with cache memory system 150 and loads instruction cache 220, constant buffer 218, and a register file banks/output buffer 222 with instructions and data from cache memory system 150. Load control unit 212 also saves the data in output buffer 222 to cache memory system 150. Load control unit 212 also provides instructions to texture engine 140 and receives results from the texture engine. Output buffer 222 stores intermediate results and final results from ALU 216 and texture engine 140. A demultiplexer (Demux) 224 receives the final results for the executed threads from output buffer 222 and provides these results to programs 110a through 110p.

In an embodiment, instruction cache 220 is implemented with a tile architecture that can avoid instruction thrashing among the programs sharing the cache. The tile architecture also allows the available cache storage space to be efficiently shared among all of the programs. The tile architecture partitions instruction cache 220 into multiple (T) tiles. In an embodiment, the T tiles have the same size, and each tile includes a predetermined number of cache lines. A cache line may be of any size and may store any number of instructions. A cache line can typically be filled from or saved to another memory in one clock cycle. In this embodiment, each program may be assigned one or more tiles based on the program's cache usage and the available tiles. In another embodiment, the tiles have different sizes that may be fixed or configurable. In this embodiment, each program may be assigned one tile (or possibly multiple tiles) of an appropriate size based on the program's cache usage and the available tiles. For clarity, the following description is for the embodiment with T equal-size tiles. For simplicity, the following description assumes that each tile can store K instructions, where K may be any value.

Figure 3:
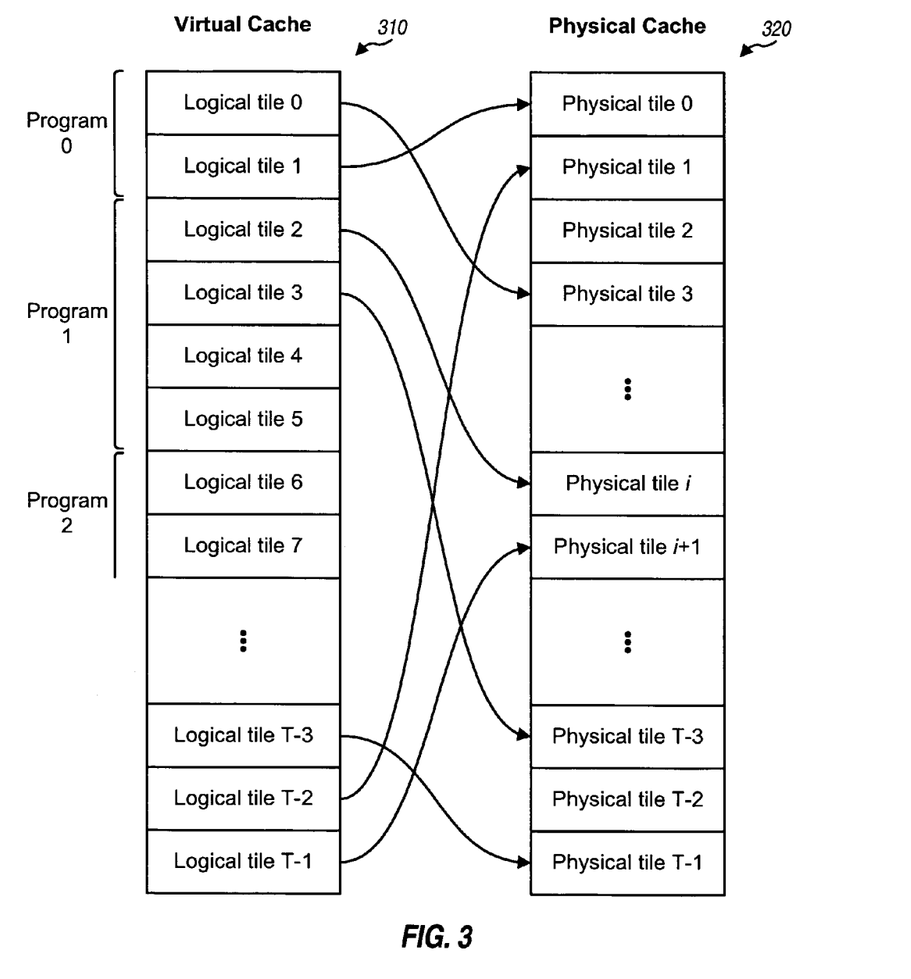
FIG. 3 shows logical tiles and physical tiles for a cache with a tile architecture.

FIG. 3 shows an embodiment of logical tiles and physical tiles for instruction cache 220. In this embodiment, instruction cache 220 appears as a virtual cache 310 to the programs. Virtual cache 310 includes T logical tiles 0 through T−1. Each program may be assigned any number of consecutive logical tiles. In the example shown in FIG. 3, program 0 is assigned logical tiles 0 and 1, program 1 is assigned logical tiles 2 through 5, etc.

Instruction cache 220 implements a physical cache 320 that stores instructions for the programs. Physical cache 320 includes T physical tiles 0 through T−1, with each physical tile being capable of storing K instructions. Each logical tile is mapped to one physical tile. An exemplary mapping for some logical tiles is shown in FIG. 3. In this example, physical tile 0 stores instructions for logical tile 1, physical tile 1 stores instructions for logical tile T−2, etc.

The use of logical tiles and physical tiles may simplify assignment of tiles to programs and management of the tiles. For example, a given program may be assigned additional, fewer, or different logical tiles by simply updating look-up tables, without having to transfer instructions among physical tiles. The assignment of consecutive logical tiles to each program may simplify generation of addresses, as described below.

Figure 4:
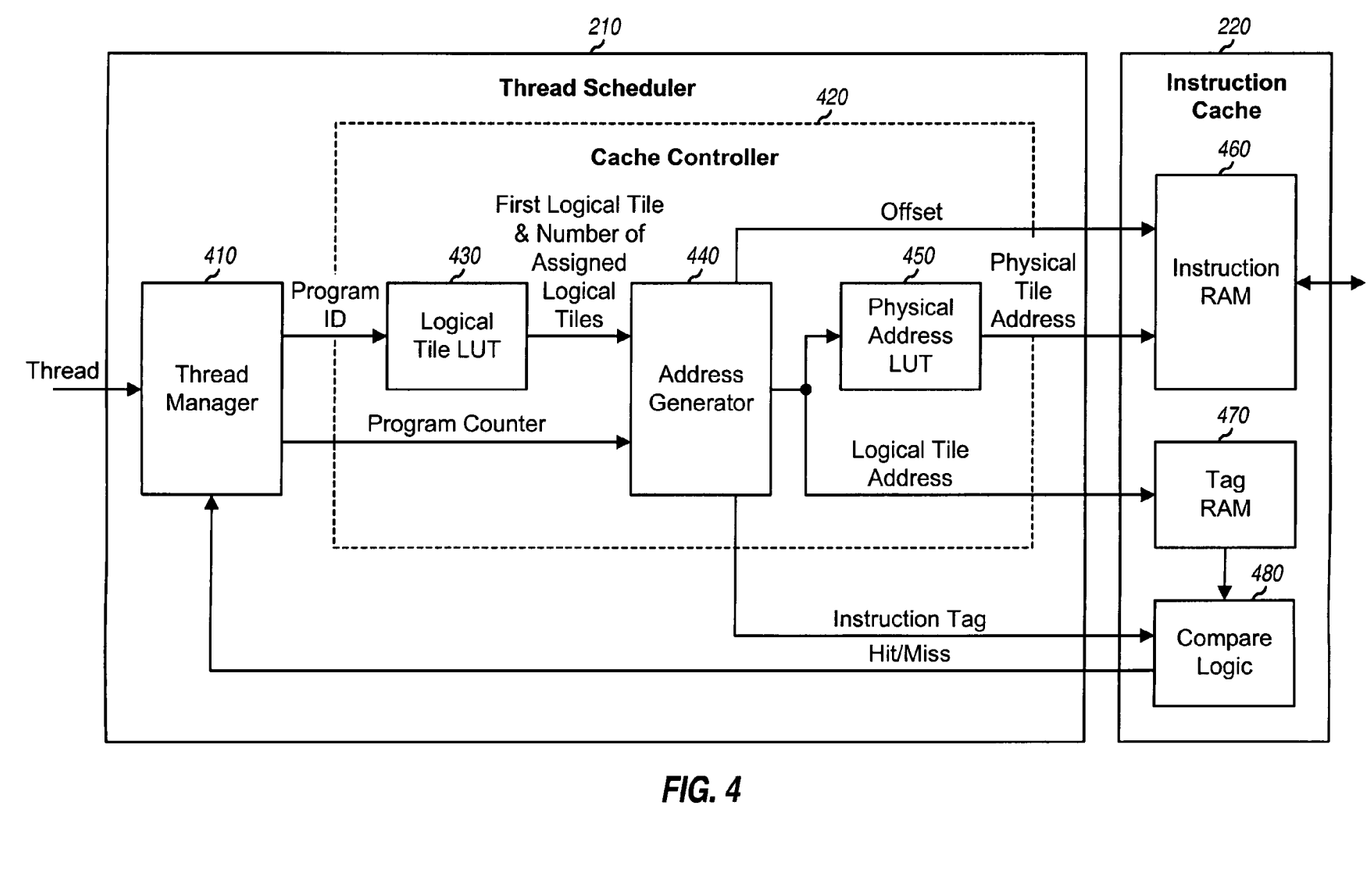
FIG. 4 shows a thread scheduler and an instruction cache within the shader core.

FIG. 4 shows an embodiment of thread scheduler 210 and instruction cache 220 in FIG. 3. Within thread scheduler 210, a thread manager 410 receives a thread to be executed and provides a program ID and a program counter for the thread. The program ID identifies the program to which the thread belongs. The program counter indicates the current instruction to execute for the thread, which is referred to as the desired instruction.

A cache controller 420 manages the logical and physical tiles and generates cache addresses. Within cache controller 420, a logical tile look-up table (LUT) 430 receives the program ID and provides the first logical tile as well as the number of logical tiles assigned to the program. For the example shown in FIG. 3, look-up table 430 would provides '2' as the first logical tile and '4' as the number of assigned tiles for program 1. An address generator 440 receives the program counter, the first logical tile, and the number of assigned tiles. Address generator 440 provides the address of the logical tile containing the desired instruction, an offset within this logical tile for the desired instruction, and an instruction tag. A physical address look-up table 450 receives the logical tile address and provides the address of the physical tile mapped to this logical tile address. The operation of the units within cache controller 420 is described below.

Instruction cache 220 includes an instruction random access memory (RAM) 460, a tag RAM 470, and compare logic 480. Tag RAM 470 receives the logical tile address and provides a tag that indicates the section of the program currently stored in instruction RAM 460 for the logical tile address. Compare logic 480 receives the stored tag from tag RAM 470 and the instruction tag from address generator 440. Compare logic 480 compares the two tags, provides a cache hit if the two tags are equal, and provides a cache miss otherwise. A cache hit means that the program section containing the desired instruction is stored in instruction RAM 460. Thread scheduler 210 receives the cache miss/hit indicator from compare logic 480, schedules execution of the desired instruction if there is a cache hit, and stalls execution of the instruction if there is a cache miss. The operation of the units within instruction cache 220 is described below.

Figure 5:
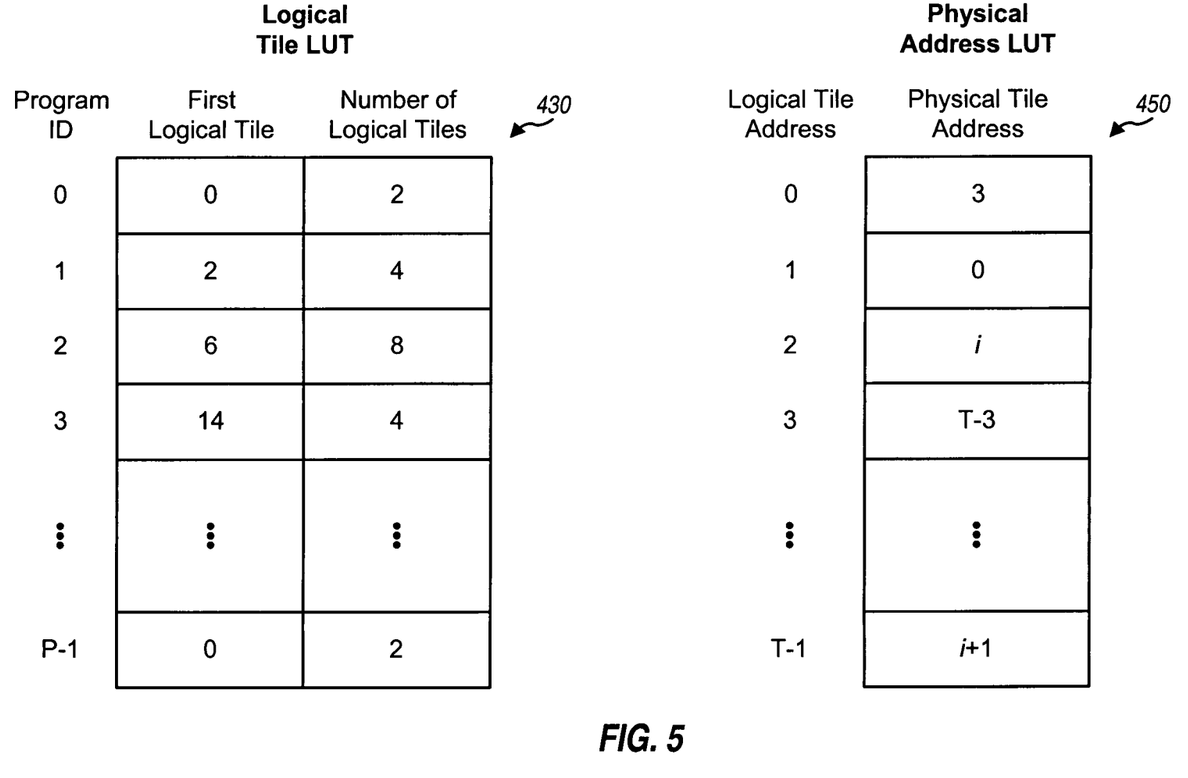
FIG. 5 shows a logical tile look-up table and a physical address look-up table.

FIG. 5 shows an embodiment of logical tile look-up table 430 and physical address look-up table 450 within cache controller 420 in FIG. 4. In this embodiment, logical tile look-up table 430 includes P entries for the P programs, one entry for each program. The P entries may be indexed by the program ID. The entry for each program includes a field for the first logical tile assigned to the program and another field for the number of logical tiles assigned to the program. In the example shown in FIG. 3, program 0 is assigned two logical tiles starting with logical tile 0, program 1 is assigned four logical tiles starting with logical tile 2, program 2 is assigned eight logical tiles starting with logical tile 6, etc. Each program may be assigned consecutive logical tiles to simplify address generation. However, the programs may be assigned logical tiles in any order, e.g., logical tile 0 may be assigned to any program.

In the embodiment shown in FIG. 5, physical address look-up table 450 includes T entries for the T logical tiles, one entry for each logical tile. The T entries may be indexed by logical tile address. The entry for each logical tile indicates the physical tile to which that logical tile is mapped. In the example shown in FIG. 3, logical tile 0 is mapped to physical tile 3, logical tile 1 is mapped to physical tile 0, logical tile 2 is mapped to physical tile i, logical tile 3 is mapped to physical tile T−3, etc. Look-up tables 430 and 450 may be updated whenever a program is assigned additional, fewer, and/or different logical tiles, as described below.

Figure 6:
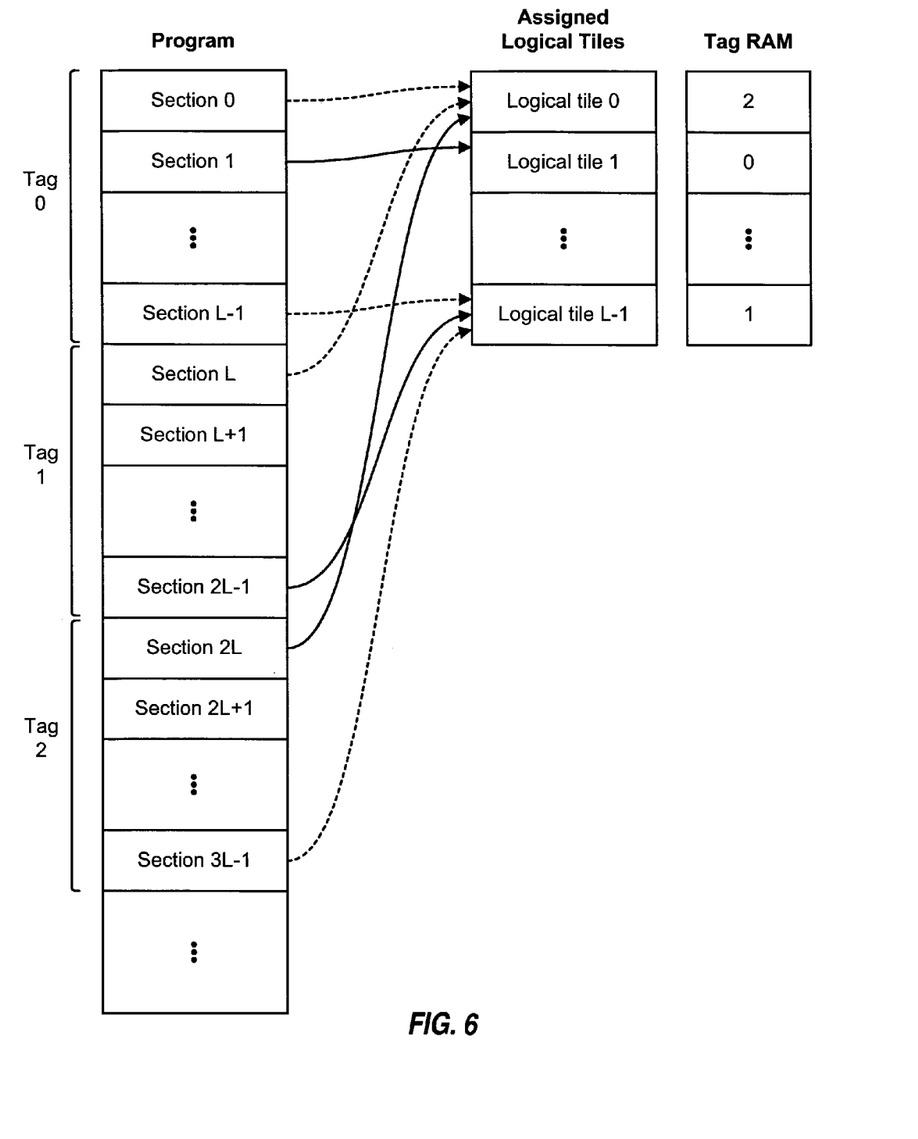
FIG. 6 shows direct mapping of a program to logical tiles.

FIG. 6 shows an exemplary mapping of a program to its assigned logical tiles for a direct mapped scheme. The program is assigned L logical tiles, where L may be any positive integer value. However, to simplify address computation, L may be a power of two, e.g., 2, 4, 8, etc. In general, the L assigned logical tiles may be any of the T available logical tiles. To simplify the description below, the L assigned logical tiles are logical tiles 0 through L−1.

The program may be divided into sequentially numbered sections, with each section being equal to the size of one physical tile. In the direct mapped scheme, each section of the program is mapped to one assigned logical tile. For example, sections 0, L, 2L, etc. of the program may be mapped to assigned logical tile 0, sections 1, L+1, 2L+1, etc. of the program may be mapped to assigned logical tile 1, etc. In general, program section x may be mapped to assigned logical tile y, where y=(x MOD L) and MOD L denotes a modulo-L operation.

The sections of the program are also identified by tags. Sections 0 through L−1 have a tag of 0, sections L through 2L−1 have a tag of 1, etc. A tag RAM stores the tag of the program section being stored in each logical tile. In the example shown in FIG. 6, the tag RAM indicates that logical tile 0 stores program section 2L having a tag of 2, logical tile 1 stores program section 1 having a tag of 0, etc.

The direct mapped scheme reduces the number of compare operations in order to determine whether a desired instruction is stored in instruction cache 220. Since the desired instruction can be stored in only one assigned logical tile, only one compare operation may be performed to determine whether the desired instruction is stored in instruction cache 220. In another embodiment, an N-way set associate scheme is used, and each section of the program may be mapped to any one of N possible logical tiles, where N>1. Up to N compare operations may be performed to determine whether the desired instruction is stored in any of the N possible logical tiles for that instruction. For clarity, the following description is for the direct mapped scheme.

Figure 7:
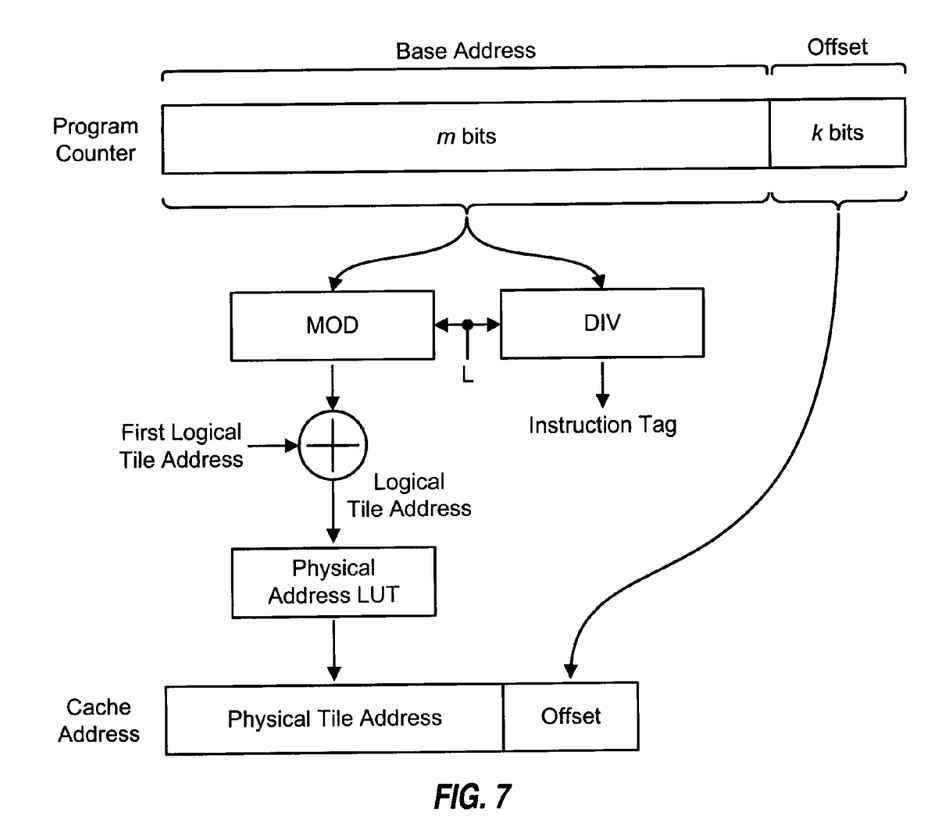
FIG. 7 shows address generation for the instruction cache.

FIG. 7 shows address generation for instruction cache 220. The program counter includes a predetermined number of bits and is partitioned into k least significant bits (LSBS) and m most significant bits (MSBs). k is determined by the size of each physical tile and may be given as $K=2^k$, where K is the tile size given in units of number of instructions. m is the remaining bits of the program counter.

The k LSBs of the program counter are used as an offset for a physical tile. The m MSBs of the program counter are used as a base address, which is the start address of the program section containing the desired instruction (or simply, the desired program section). The base address is used to determine the logical tile containing the desired program section as well as the tag of this section.

The logical tile to which the desired program section is mapped may be determined as follows:

$$\text{Logical Tile Address} = (\text{Base Address MOD } L) + \text{First Logical Tile Address.} \qquad \text{Eq (1)}$$

The physical tile associated with this logical tile may be obtained by looking up the logical tile address, as follows:

$$\text{Physical Tile Address} = \text{LUT (Logical Tile Address)}, \qquad \text{Eq (2)}$$

where LUT( ) denotes a look-up operation.

The tag of the desired program section may be determined as follows:

$$\text{Instruction Tag} = \text{Base Address DIV } L, \qquad \text{Eq (3)}$$

where DIV denotes an operation that provides the quotient. If L is a power of two, or $L=2^l$, then the MOD operation in equation (1) provides the l LSBs of the base address, and the DIV operation in equation (3) provides the remaining m−l MSBs of the base address.

The cache address is obtained by concatenating the physical tile address with the offset, as follows:

$$\text{Cache Address} = \text{Physical Tile Address} \| \text{Offset}, \qquad \text{Eq (4)}$$

where "∥" denotes a concatenation operation.

Figure 8:
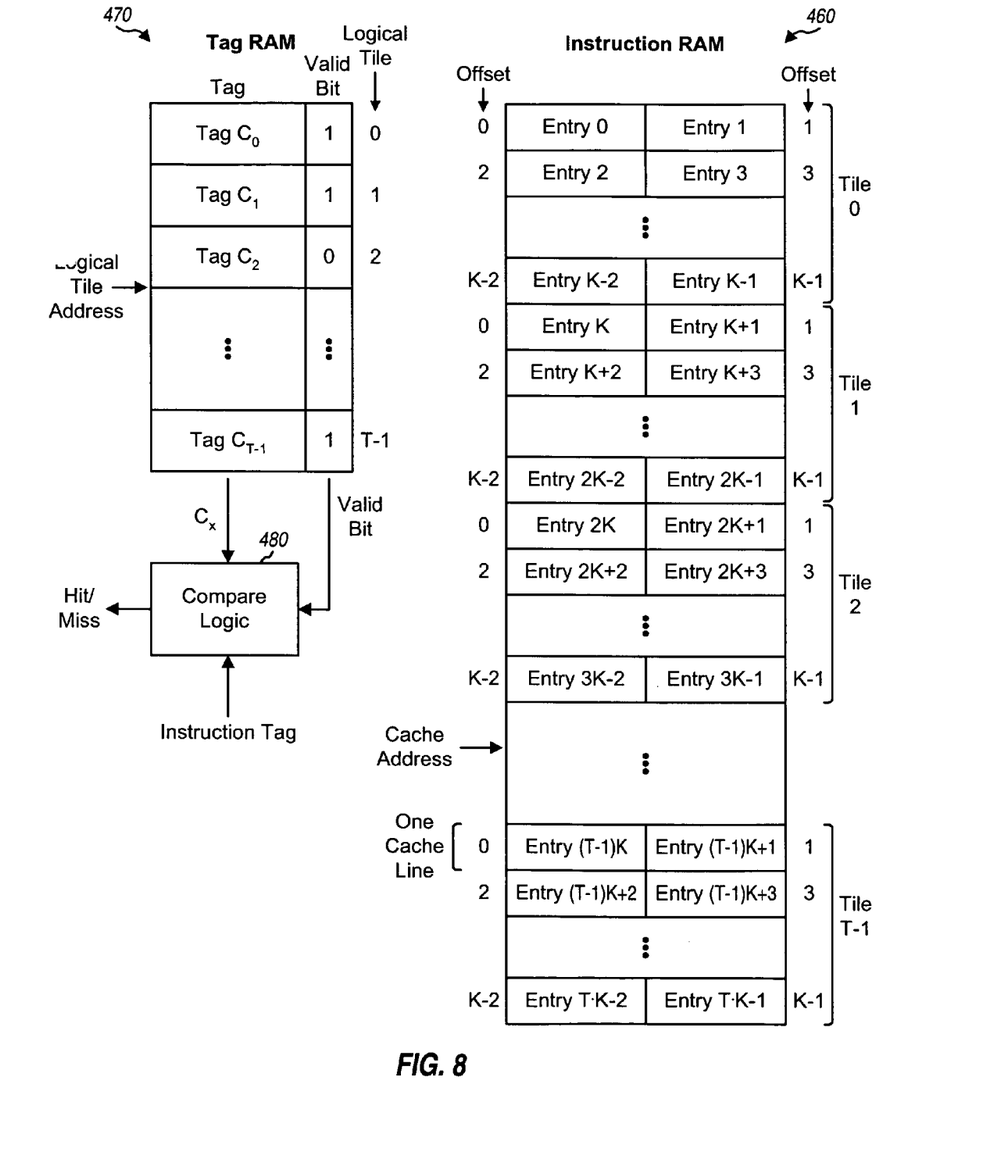
FIG. 8 shows a tag RAM and an instruction RAM within the instruction cache.

FIG. 8 shows an embodiment of tag RAM 470 within instruction cache 220 in FIG. 4. Tag RAM 470 includes T entries for the T logical tiles, one entry for each logical tile. The T entries may be indexed by the logical tile address from address generator 440 in FIG. 4. In the embodiment shown in FIG. 8, the entry for each logical tile includes a tag and a valid bit. The tag indicates the base address of the program section stored in the logical tile (or actually the physical tile associated with the logical tile). In the example shown in FIG. 3, the entry for logical tile 0 stores the tag of the program section stored in physical tile 3, the entry for logical tile 1 stores the tag of the program section stored in physical tile 0, etc. The valid bit for each logical tile indicates whether that logical tile currently stores a program section. When a program is assigned a new logical tile, the valid bit may be set to '0' to indicate no valid data for the logical tile. The valid bit may be set to '1' and the tag may be updated after filling the logical tile with a program section.

To determine whether the desired instruction is stored in a given logical tile, the tag for that logical tile is obtained from tag RAM 470 and compared against the instruction tag from address generator 440. If the two tags match and if the valid bit is '1', then there is a cache hit. In this case, the desired instruction is stored in the logical tile and may be retrieved from instruction RAM 460 at the cache address for this instruction. The cache address contains the proper physical tile address as well as the offset for the tile. If there is a cache miss, then the physical tile may be filled with the program section containing the desired instruction. The tag for the associated logical tile is then updated with the tag of the program section loaded into the physical tile.

As an example, address generator 440 may indicate that the desired instruction is in program section a, which is mapped to logical tile b. Physical address look-up table 450 may indicate that logical tile b is mapped to physical tile c. If tag RAM 470 indicates that the program section stored in logical tile b has tag a, then there is a cache hit, and the desired instruction may be retrieved from physical tile c. Conversely, if tag RAM 470 indicates that the program section stored in logical tile b has a tag other than a, then there is a cache miss. Program section a may then be loaded into physical tile c, and tag RAM 470 may be updated to store tag a for logical tile b.

In the embodiment shown in FIGS. 4 and 8, the tags in tag RAM 470 are indexed by logical tile address. This embodiment allows for earlier look-up of the tag in tag RAM 470 since the logical tile address is available before the physical tile address. In another embodiment, the tags in tag RAM 470 are indexed by physical tile address. The manner in which the tags are indexed may affect how the tags are updated whenever programs are assigned, re-assigned, and de-assigned logical tiles.

FIG. 8 also shows an embodiment of instruction RAM 460 within instruction cache 220. In this embodiment, each cache line includes two entries, and each entry stores one instruction. Each tile includes K/2 cache lines for K entries that are associated with offsets of 0 through K−1. The cache address generated in FIG. 7 includes a physical tile address for a specific tile within instruction RAM 460 and an offset for a specific entry within this tile. In general, a tile may include any number of cache lines, and each cache line may be of any size and may store any number of instructions.

Logical tiles may be dynamically assigned and de-assigned to programs based on the number of programs being executed, the cache usage of these programs, the available logical tiles, and/or other factors. If a program retires from execution, then the logical tiles assigned to this program may be re-assigned to other programs. If a new program is activated, then logical tiles may be taken from other programs and assigned to this new program.

The following operations may be supported:
1. re-assignment of the same number of logical tiles to a program,
2. assignment of additional logical tiles to a program,
3. de-assignment of logical tiles from a program,
4. retirement of a program, and
5. activation of a new program.

A program may be re-assigned the same number of logical tiles, e.g., when another program retires or a new program is activated. In this case, logical tile look-up table 430 is updated with the new first logical tile for the program. Physical address look-up table 450 is updated by moving the physical tile addresses from the old logical tile addresses/locations to the new logical tile addresses. Tag RAM 470 is also updated by moving the tags from the old logical tile addresses to the new logical tile addresses.

A program may be assigned additional logical tiles, e.g., when logical tiles become available and/or the cache usage of the program increases. In this case, logical tile look-up table 430 is updated with the new number of assigned logical tiles (a new L value) for the program. The tags of the program sections currently stored in instruction RAM 460 are recomputed with the new L value and stored in the proper logical tile addresses in tag RAM 470. The valid bits for the newly assigned logical tiles may be set to '0' to indicate no valid data for these logical tiles.

A program may be de-assigned some logical tiles, e.g., when a new program is activated. In this case, logical tile look-up table 430 is updated with the new number of assigned logical tiles (a new L value) for the program. The tags of the program sections currently stored in instruction RAM 460 are recomputed with the new L value. The tags for currently assigned logical tiles are stored in the proper logical tile addresses in tag RAM 470. The tags for de-assigned logical tiles are discarded.

A program may be retired when execution of the program is completed. All of the logical tiles assigned to the program may be reclaimed and assigned to other programs. Logical tile look-up table 430 may be updated with zero assigned logical tiles (L=0) for the program.

A new program may be activated and assigned one or more logical tiles. Logical tile look-up table 430 may be updated with the first logical tile and the number of logical tiles assigned to the new program. The valid bits for the newly assigned logical tiles may be set to '0'.

Any combination of the above operations may be performed at any given moment. For example, the retirement of a program may result in assignment and/or re-assignment of logical tiles for remaining programs. The activation of a new program may result in de-assignment and/or re-assignment of logical tiles for other programs. As an example, logical tiles may be initially assigned to programs as shown in FIG. 5. Program 2 may then retire from execution, and the eight logical tiles assigned to this program may be re-assigned to other programs. For example, program 0 may be assigned logical tiles 0 to 7, program 1 may be assigned logical tiles 8 to 11, and program 3 may be assigned logical tiles 12 to 17. In this example, program 0 is assigned six additional logical tiles, program 1 is re-assigned logical tiles, and program 3 is assigned two additional logical tiles. Look-up tables 430 and 450 and tag RAM 470 may be updated for these programs as described above.

For clarity, a specific embodiment of instruction cache 220 using logical tiles and physical tiles is described above. In another embodiment, logical tiles are not used, and the programs are assigned physical tiles and mapped directly to their assigned physical tiles. A look-up table may be used to identify which physical tiles are assigned to each program.

A tiled cache is a cache that is implemented with a tile architecture. In general, a tiled cache may include any number of tiles, which may have the same size or different sizes. Programs may be assigned logical tiles or physical tiles and may be mapped to the assigned tiles using direct mapped or N-way set associate. The tag RAM may store tags indexed by logical tile address or physical tile address. In general, a tile cache may be implemented in various manners. The operation of various units for the tiled cache may be determined by and matched to the design of the tiled cache.

A tiled cache may be used to store various types of data. In the embodiment shown in FIG. 2, instruction cache 220 and constant buffer 218 may each be implemented with a tiled cache. One or more tiled caches may also be used in cache memory system 150 to store various types of data such as, e.g., pixels, texture maps, etc.

A tiled cache may provide certain benefits such as avoidance of trashing among the programs sharing the cache, lower power consumption for tag comparison, smaller integrated circuit (IC) area, and so on.

The caching techniques described herein may be used for wireless communication, computing, networking, personal electronics, etc. An exemplary use of the techniques for wireless communication is described below.

Figure 9:
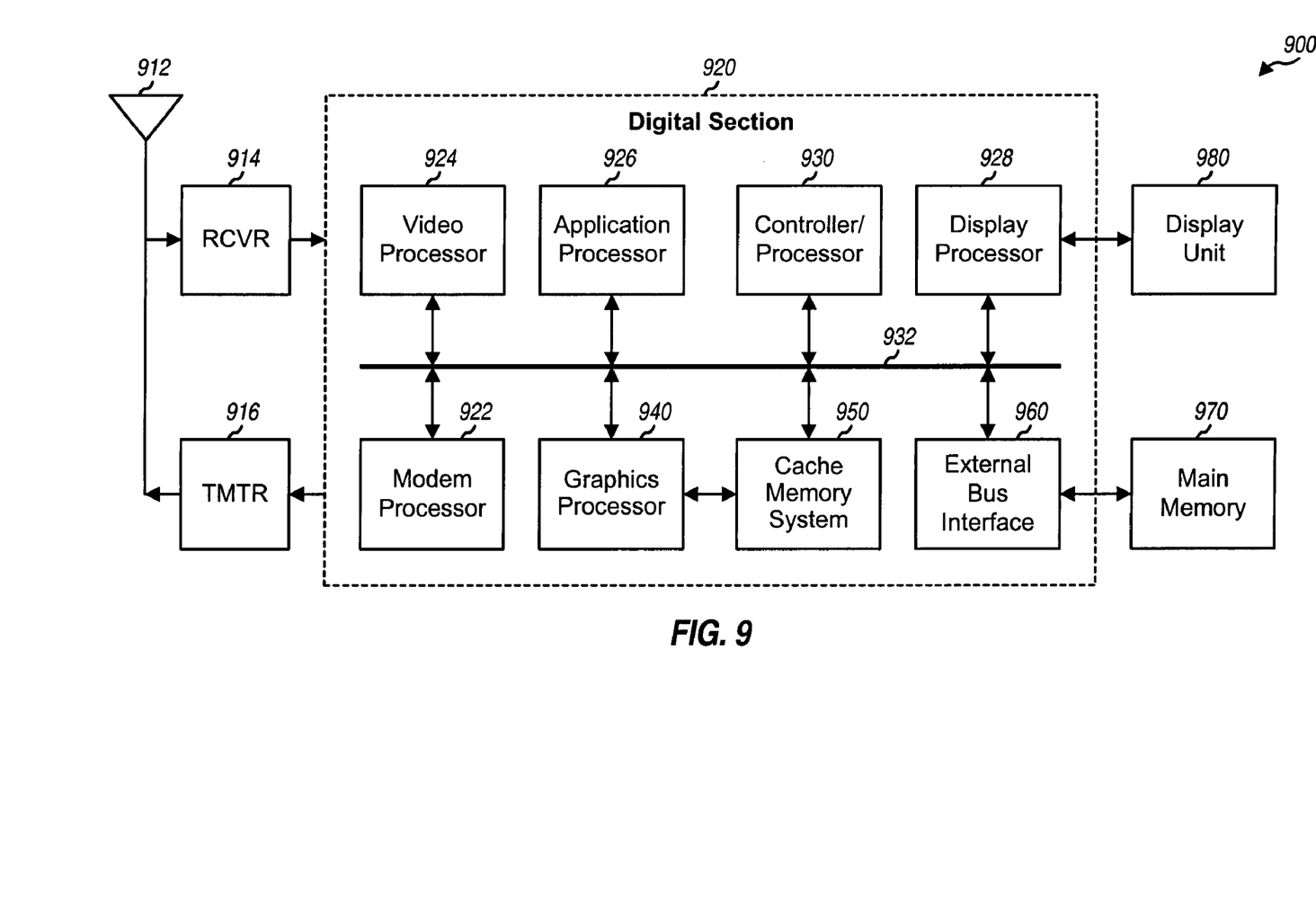
FIG. 9 shows a block diagram of a wireless device.

FIG. 9 shows a block diagram of an embodiment of a wireless device 900 in a wireless communication system. Wireless device 900 may be a cellular phone, a terminal, a handset, a personal digital assistant (PDA), or some other device. The wireless communication system may be a Code Division Multiple Access (CDMA) system, a Global System for Mobile Communications (GSM) system, or some other system.

Wireless device 900 is capable of providing bi-directional communication via a receive path and a transmit path. On the receive path, signals transmitted by base stations are received by an antenna 912 and provided to a receiver (RCVR) 914. Receiver 914 conditions and digitizes the received signal and provides samples to a digital section 920 for further processing. On the transmit path, a transmitter (TMTR) 916 receives data to be transmitted from digital section 920, processes and conditions the data, and generates a modulated signal, which is transmitted via antenna 912 to the base stations.

Digital section 920 includes various processing and interface units such as, for example, a modem processor 922, a video processor 924, an application processor 926, a display processor 928, a controller/processor 930, a graphics processor 940, and an external bus interface (EBI) 960. Modem processor 922 performs processing for data transmission and reception, e.g., encoding, modulation, demodulation, and decoding. Video processor 924 performs processing on video content (e.g., still images, moving videos, and moving texts) for video applications such as camcorder, video playback, and video conferencing. Application processor 926 performs processing for various applications such as multi-way calls, web browsing, media player, and user interface. Display processor 928 performs processing to facilitate the display of videos, graphics, and texts on a display unit 980. Controller/processor 930 may direct the operation of various processing and interface units within digital section 920.

Graphics processor 940 performs processing for graphics applications and may be implemented as described above. For example, graphics processor 940 may include thread scheduler 210 and instruction cache 220 in FIGS. 2 and 4. A cache memory system 950 stores instructions and/or data for graphics processor 940. EBI 960 facilitates transfer of data between digital section 920 and main memory 970.

Digital section 920 may be implemented with one or more digital signal processors (DSPs), micro-processors, reduced instruction set computers (RISCs), etc. Digital section 920 may also be fabricated on one or more application specific integrated circuits (ASICs) or some other type of integrated circuits (ICs).

The caching techniques described herein may be implemented in various hardware units. For example, the cache may be implemented in ASICs, digital signal processing device (DSPDs), programmable logic devices (PLDs), field programmable gate array (FPGAs), processors, controllers, micro-controllers, microprocessors, and other electronic units.

Certain portions of the caching techniques may be implemented in firmware and/or software. For example, the management and control of a tiled cache may be implemented with firmware and/or software modules (e.g., procedures, functions, and so on) that perform the functions described herein. The firmware and/or software codes may be stored in a memory (e.g., memory 970 in FIG. 9) and executed by a processor (e.g., processor 930). The memory may be implemented within the processor or external to the processor.

The previous description of the disclosed embodiments is provided to enable any person skilled in the art to make or use the invention. Various modifications to these embodiments will be readily apparent to those skilled in the art, and the generic principles defined herein may be applied to other embodiments without departing from the spirit or scope of the invention. Thus, the invention is not intended to be limited to the embodiments shown herein but is to be accorded the widest scope consistent with the principles and novel features disclosed herein.

What is claimed is:

1. An apparatus comprising:
a cache operative to provide storage for multiple programs and partitioned into multiple physical tiles, wherein each of the physical tiles is comprised of one or more cache lines, wherein at least one program of the multiple programs is partitioned into a plurality of program sections, and wherein one of the physical tiles is configured to store one of the program sections of the program; and
a cache controller operative to identify the physical tiles and to generate cache addresses for accessing the physical tiles of the cache, wherein the cache controller assigns one logical tile of a plurality of logical tiles to at least one program section of the plurality of program sections, maps the logical tiles to the physical tiles, and identifies the physical tiles based on the mapping of the logical tiles to the physical tiles.

2. The apparatus of claim 1, wherein each program is assigned at least two consecutive logical tiles.

3. The apparatus of claim 1, wherein each program is assigned at least one of the logical tiles and is mapped to at least one of the physical tiles based on direct mapping.

4. The apparatus of claim 1, wherein each of the programs is assigned at least one of the logical tiles and is mapped to at least one of the physical tiles based on N-way set associate mapping, where N is greater than one.

5. The apparatus of claim 1, wherein the cache controller comprises
a look-up table operative to identify the logical tiles assigned to the multiple programs.

6. The apparatus of claim 5, wherein each of the programs is assigned at least two consecutive logical tiles, and wherein the look-up table stores a first one of the logical tiles and the number of the logical tiles assigned to each of the programs.

7. The apparatus of claim 1, wherein the cache controller comprises
a look-up table operative to store a mapping of the logical tiles to the physical tiles.

8. The apparatus of claim 1, wherein the cache controller comprises
an address generator operative to receive a program counter for the at least one program of the multiple programs and to provide an address of one of the logical tiles corresponding to the program counter.

9. The apparatus of claim 8, wherein the address generator further determines a tag for the program counter based on direct mapping of the at least one program of the multiple programs to at least one of the logical tiles assigned to the program.

10. The apparatus of claim 1, wherein the cache controller comprises
an address generator operative to receive a program counter for the at least one program of the multiple programs, to obtain a base address for a program section from the program counter, to derive an address of one of the logical tiles with the base address, a first one of the logical tiles assigned to the program, and the number of the logical tiles assigned to the program, and to derive a tag for the program counter with the base address and the number of logical tiles assigned to the program.

11. The apparatus of claim 1, wherein the cache controller receives an indication of the at least one program of the multiple programs being activated and assigns at least one of the logical tiles to the program.

12. The apparatus of claim 11, wherein the cache controller receives an indication of the at least one program of the multiple programs retiring and re-assigns at least one of the logical tiles to at least one other program.

13. The apparatus of claim 1, wherein the cache comprises
a first memory operative to provide storage for the multiple programs and partitioned into the multiple physical tiles, and
a second memory operative to store tags for the multiple physical tiles in the first memory.

14. The apparatus of claim 1, wherein the cache is operative to store instructions for the multiple programs.

15. The apparatus of claim 1, wherein the cache is operative to store constant values for the multiple programs.

16. An integrated circuit comprising:
a cache operative to provide storage for multiple programs and partitioned into multiple physical tiles, wherein each of the physical tiles is comprised of one or more cache lines, wherein at least one program of the multiple programs is partitioned into a plurality of program sections, and wherein one of the physical tiles is configured to store one of the program sections of the program; and
a cache controller operative to identify the physical tiles and to generate cache addresses for accessing the physical tiles of the cache, wherein the cache controller assigns one logical tile of a plurality of logical tiles to at least one program section of the plurality of program sections, maps the logical tiles to the physical tiles, and identifies the physical tiles based on the mapping of the logical tiles to the physical tiles.

17. The integrated circuit of claim 16, wherein the cache controller receives a program counter for one of the programs, derives a logical tile address based on the program counter, and generates a physical tile address based on the logical tile address and the mapping of logical tiles to physical tiles.

18. The integrated circuit of claim 16, wherein the cache controller comprises
an address generator operative to receive a program counter for the at least one program of the multiple programs, to obtain a base address for a program section from the program counter, to derive an address of one of the logical tiles with the base address, a first one of the logical tiles assigned to the program, and the number of the logical tiles assigned to the program, and to derive a tag for the program counter with the base address and the number of logical tiles assigned to the program.

19. A method comprising:
assigning, with a cache controller, multiple physical tiles in a cache to multiple programs, wherein each of the physical tiles is comprised of one or more of cache lines, wherein at least one program of the multiple programs is partitioned into a plurality of program sections, and wherein one of the physical tiles is configured to store one of the program sections of the program;
receiving, with the cache controller, an access request from the program among the multiple programs;
identifying, with the cache controller, at least one of the physical tiles; and
generating, with the cache controller, a cache address based on the at least one of the physical tiles,
wherein the assigning the multiple tiles in the cache to the multiple programs comprises:
assigning, with the cache controller, one logical tile of a plurality of logical tiles to at least one program section of the plurality of program sections, and
mapping, with the cache controller, the logical tiles to physical tiles within the cache, and
wherein identifying, with the cache controller, at least one of the physical tiles comprises identifying the at least one of the physical tiles based on the mapping of the logical tiles to the physical tiles.

20. The method of claim 19, wherein the generating the cache address comprises
receiving a program counter for the at least one of the programs,
deriving a logical tile address based on the program counter, and
generating a physical tile address based on the logical tile address and the mapping of logical tiles to physical tiles.

21. An apparatus comprising:
means for assigning multiple physical tiles in a cache to multiple programs, wherein each of the physical tiles is comprised of one or more cache lines, wherein at least one program of the multiple programs is partitioned into a plurality of program sections, and wherein one of the physical tiles is configured to store one of the program sections of the program;
means for receiving an access request from the program among the multiple programs;
means for identifying at least one of the physical tiles; and
means for generating a cache address based on the at least one of the physical tiles,
wherein the means for assigning the multiple tiles in the cache to the multiple programs comprises:
means for assigning one logical tile of a plurality of logical tiles to at least one program section of the plurality of program sections, and
means for mapping the logical tiles to physical tiles within the cache,
wherein the means for identifying at least one of the physical tiles comprises means for identifying the at least one of the physical tiles based on the mapping of the logical tiles to the physical tiles, and
wherein at least one of the means for assigning the multiple physical tiles, the means for receiving, the means for identifying, and the means for generating is implemented at least partially with one or more hardware units.

22. The apparatus of claim 21, wherein the means for generating the cache address comprises
- means for receiving a program counter for the at least one of the programs,
- means for deriving a logical tile address based on the program counter, and
- means for generating a physical tile address based on the logical tile address and the mapping of logical tiles to physical tiles.

23. A wireless device comprising:
- a graphics processor operative to perform graphics operations and comprising:
  - an instruction cache operative to store instructions for multiple programs and partitioned into multiple physical tiles, wherein each of the physical tiles is comprised of one or more cache lines, wherein at least one program of the multiple programs is partitioned into a plurality of program sections, and wherein one of the physical tiles is configured to store one of the program sections of the program; and
  - a cache controller operative to identify the physical tiles and to generate cache addresses for accessing the physical tiles of the instruction cache, wherein the cache controller assigns one logical tile of a plurality of logical tiles to at least one program section of the plurality of program sections, maps the logical tiles to the physical tiles, and identifies the physical tiles based on the mapping of the logical tiles to the physical tiles.

24. The wireless device of claim 23, wherein the cache controller receives a program counter for one of the programs, derives a logical tile address based on the program counter, and generates a physical tile address based on the logical tile address and the mapping of logical tiles to physical tiles.

* * * * *